United States Patent [19]

Schriever

[11] Patent Number: 5,378,293
[45] Date of Patent: Jan. 3, 1995

[54] NON-CHROMATED OXIDE COATING FOR ALUMINUM SUBSTRATES

[75] Inventor: Matthias P. Schriever, Kent, Wash.

[73] Assignee: The Boeing Company, Seattle, Wash.

[21] Appl. No.: 58,655

[22] Filed: May 6, 1993

Related U.S. Application Data

[63] Continuation of Ser. No. 732,568, Jul. 19, 1991, abandoned, which is a continuation-in-part of Ser. No. 525,800, May 17, 1990, Pat. No. 5,298,092, and a continuation-in-part of Ser. No. 621,132, Nov. 30, 1990.

[51] Int. Cl.$^6$ ............................................. C23C 22/56
[52] U.S. Cl. .................................... 148/275; 148/243; 148/274; 148/284; 148/286; 427/305; 427/435; 427/437
[58] Field of Search .............. 148/243, 274, 275, 284, 148/286; 427/305, 435, 437

[56] References Cited

U.S. PATENT DOCUMENTS

| | | | |
|---|---|---|---|
| 1,551,613 | 9/1925 | Pacz ..................................... | 148/273 |
| 1,607,676 | 11/1926 | Jirotka ................................ | 148/242 |
| 2,796,370 | 6/1957 | Ostrander et al. .................. | 148/268 |
| 2,796,371 | 6/1957 | Ostrander et al. .................. | 148/268 |

(List continued on next page.)

FOREIGN PATENT DOCUMENTS

| | | |
|---|---|---|
| 39376/89 | 8/1990 | Australia . |
| 356756 | 7/1990 | European Pat. Off. . |
| 0405340 | 1/1991 | European Pat. Off. . |
| 0458020 | 11/1991 | European Pat. Off. . |
| 0488430 | 6/1992 | European Pat. Off. . |
| 745704 | 11/1944 | Germany . |

(List continued on nest page.)

OTHER PUBLICATIONS

European Search Report on Application. Ser. No. EP 91 20 2181 (corr. to U.S. Appln. No. 07/621,132) dated 12 Oct. 1992.
Pascal, "Nouveau Traité de Chimie Minérale", 1959,
(List continued on next page.)

Primary Examiner—Richard O. Dean
Assistant Examiner—Robert R. Koehler
Attorney, Agent, or Firm—Paul C. Cullom, Jr.

[57] ABSTRACT

(A.) A process for forming a cobalt conversion coating on a metal substrate, thereby imparting corrosion resistance and paint adhesion properties. The invention was developed as a replacement for the prior art chromic acid process. The process includes the steps of: (a) providing a cobalt conversion solution comprising an aqueous reaction solution containing a soluble cobalt-III hexacoordinated complex, the concentration of the cobalt-III hexacoordinated complex being from about 0.01 mole per liter of solution to the saturation limit of the cobalt-III hexacoordinated complex, and acetic acid; and (b) contacting the substrate with the aqueous reaction solution for a sufficient amount of time, whereby the cobalt conversion coating is formed. The substrate may be aluminum or aluminum alloy, as well as Cd plating, Zn plating, Zn—Ni plating, and steel. The cobalt-III hexacoordinated complex may be present in the form of $[Co(NH_3)_6]X_3$ wherein X is Cl, Br, $NO_3$, CN, SCN, $\frac{1}{3}PO_4$, $\frac{1}{2}SO_4$, $C_2H_3O_2$, or $\frac{1}{2}CO_3$. (B.) A chemical conversion coating solution for producing the cobalt conversion coating on a metal substrate, the solution, comprising an aqueous reaction solution containing a soluble cobalt-III hexacoordinated complex, the concentration of the cobalt-III hexacoordinated complex being from about 0.01 mole per liter of solution to the saturation limit of the cobalt-III hexacoordinated complex. The aqueous reaction solution may be prepared by a bath makeup sequence including the steps of: (a) dissolving a cobalt-II salt; (b) then dissolving a metal nitrate salt; and (c) then adding ammonium acetate. (C.) A coated article exhibiting corrosion resistance and paint adhesion properties, the article including: (a) a metal substrate; and (b) a cobalt conversion coating formed on the substrate, the cobalt conversion coating including aluminum oxide $Al_2O_3$ as the largest volume percent, and cobalt oxides CoO, $Co_3O_4$, and $Co_2O_3$.

61 Claims, 4 Drawing Sheets

U.S. PATENT DOCUMENTS

| | | | |
|---|---|---|---|
| 2,906,009 | 9/1959 | Knoll et al. | 427/435 |
| 3,138,479 | 6/1964 | Foley | 427/305 |
| 3,403,035 | 9/1968 | Schneble et al. | 106/1.25 |
| 3,423,214 | 1/1969 | Koretzky | 427/437 |
| 3,438,798 | 4/1969 | Baudrand et al. | 427/305 |
| 3,444,007 | 5/1969 | Maurer et al. | 148/273 |
| 3,592,747 | 7/1971 | Cohn | 148/6.27 |
| 3,615,740 | 10/1971 | Goltz | 106/14.11 |
| 3,790,453 | 2/1974 | Wanamaker et al. | 204/37.6 |
| 3,819,424 | 6/1974 | Russell et al. | 148/261 |
| 3,870,607 | 3/1975 | Bardach | 204/15 |
| 3,905,838 | 4/1975 | Ito | 148/6.27 |
| 3,928,237 | 12/1975 | Davis | 502/313 |
| 3,993,510 | 11/1976 | Bellavin | 148/267 |
| 4,088,486 | 5/1978 | Bissonette | 430/393 |
| 4,150,172 | 4/1979 | Kolk, Jr. | 427/305 |
| 4,208,212 | 6/1980 | Kuzuwata et al. | 148/259 |
| 4,218,240 | 8/1980 | Gingerich et al. | 75/365 |
| 4,233,063 | 11/1980 | Ritsko et al. | 75/374 |
| 4,261,766 | 4/1981 | Crouch | 148/273 |
| 4,278,463 | 7/1981 | Vanderpool et al. | 75/353 |
| 4,278,477 | 7/1981 | Reinhold | 106/14.15 |
| 4,337,097 | 6/1982 | Tokumasu et al. | 148/253 |
| 4,348,224 | 9/1982 | Gingerich et al. | 75/353 |
| 4,381,203 | 4/1983 | Reinhold | 148/270 |
| 4,392,920 | 7/1983 | McDonald | 204/37.1 |
| 4,637,374 | 1/1987 | Arai | 126/417 |
| 4,659,605 | 4/1987 | Malic et al. | 427/131 |
| 4,696,724 | 9/1987 | Deguchi et al. | 205/197 |
| 4,804,407 | 2/1989 | Scheithauer et al. | 75/372 |
| 4,897,129 | 1/1990 | Tuttle, Jr. et al. | 148/256 |

FOREIGN PATENT DOCUMENTS

| | | | |
|---|---|---|---|
| 61-238979 | 10/1986 | Japan | 148/286 |
| 953987 | 4/1964 | United Kingdom | 427/305 |
| 1345868 | 2/1974 | United Kingdom | 427/305 |
| WO91/11542 | 8/1991 | WIPO | |

OTHER PUBLICATIONS

Masson & Cie, Paris, Fr., vol. XVIII, pp. 680–681; Cobaltnitrites.

Chemical Abstracts, vol. 89, 1978, abstract no. 122118c, "Complexes of Cobalt containing ammonia or ethylenediamine . . . ".

European Search Report on Appln. No. EP 91 20 2515 (corr. to U.S. Application. Ser. No. 07/732,568) dated 9 Oct. 1992.

M. Munakata, "Some New Oxygenated Cobalt Complexes", *Bulletin Of The Chemical Society of Japan*, vol. 44, pp. 1791–1796 (1971).

S. Fukuzumi et al., "Activation Of Cobalt (III)–Alkyl Bonds Through Interaction With Organic Oxidants . . . ", *Chemistry Letters*, pp. 421–424 (1984).

I. Sasaki et al., "X–Ray And Electrochemical Investigation Of A Series Of Cobalt Complexes . . . ", *Polyhedron*, vol. 6, pp. 2103–2110 (1987).

G. Jander and E. Blasius, Einfuhrung in das anorganisch–chemische Praktikum (1968), pp. 106–107.

Van Nostrand's Scientific Encyclopedia (1983), Sixth Edition, vol. I, p. 124, "Ammines".

"Deposition of Nickel and Cobalt by Chemical Reduction", Brenner and Riddell, *Journal of Research of National Bureau of Standards*, vol. 39, pp. 385–395, Nov. 1947.

"Nickel and Cobalt Films" by Samuel Wein; *The Glass Industry*, pp. 22, 23, 35, 46; Jan. 1960.

"Regulating Coercivity of Magnetic Thin Films", Tsu & Sakamoto, IBM Technical Disclosure Bulletin, pp. 52–53, vol. 4, No. 8, Jan. 1962.

European Search Report on Application No. EP 91 10 3498 dated 28 Jun. 1991 the Hauge.

German Patent 745 704–Improved Translation of Nov. 30, 1992.

W. Fernelius ed., "69. Hexamminecobalt(III) Salts," *Inorganic Synthesis*, first edition, vol. II, pp. 216–221 (McGraw–Hill 1946).

A. Martell and M. Calvin, *Chemistry Of The Metal Chelate Compounds*, pp. 1–18 (Prentice–Hall 1952).

NON-CHROMATED OXIDE COATING FOR ALUMINUM SUBSTRATES

CROSS-REFERENCE TO RELATED APPLICATIONS

This is a continuation of copending application (s) Ser. No. 07/732,568 filed on Jul. 19, 1991, now abandoned, which is a continuation-in-part of copending U.S. application Ser. No. 07/525,800, filed May 17, 1990, now U.S. Pat. No. 5,298,092, which application is incorporated herein by reference. This application is also a continuation-in-part of copending application Ser. No. 07/621,132, filed Nov. 30, 1990, which application is incorporated herein by reference.

BACKGROUND OF THE INVENTION

1) Field of the Invention

This environmental-quality invention is in the field of chemical conversion coatings formed on metal substrates, for example, on aluminum substrates. More particularly, one aspect of the invention is a new type of oxide coating (which I refer to as a "cobalt conversion coating") which is chemically formed on metal substrates. The invention enhances the quality of the environment of mankind by contributing to the maintenance of air and water quality.

2) Description of the Related Art

In general, chemical conversion coatings are formed chemically by causing the surface of the metal to be "converted" into a tightly adherent coating, all or part of which consists of an oxidized form of the substrate metal. Chemical conversion coatings can provide high corrosion resistance as well as strong bonding affinity for paint. The industrial application of paint (organic finishes) to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly the high-copper 2000-series aluminum alloys, such as alloy 2024-T3, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The resulting conversion coating on the surface of the aluminum component offers resistance to corrosion and a bonding surface for organic finishes.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for organic finishes. The present invention relates to this second type of process for producing chemical conversion coatings. The chemical solution may be applied by immersion application, by various types of manual application, or by spray application.

One widely-used chromic acid process for forming chemical conversion coatings on aluminum substrates is described in various embodiments in Ostrander et al. U.S. Pat. No. 2,796,370 and Ostrander et al. U.S. Pat. No. 2,796,371, in military process specification MIL-C-5541, and in Boeing Process Specification BAC 5719. These chromic acid chemical conversion baths contain hexavalent chromium, fluorides, and cyanides, all of which present significant environmental as well as health and safety problems. The constituents of a typical chromic acid conversion bath, such as ALODINE 1200, are as follows: $CrO_3$—"chromic acid" (hexavalent chromium); NaF—sodium fluoride; $KBF_4$—potassium tetrafluoroborate; $K_2ZrF_6$—potassium hexafluorozirconate; $K_3Fe(CN)_6$—potassium ferricyanide; and, $HNO_3$—nitric acid (for pH control).

Many aluminum structural parts, as well as Cd plated, Zn plated, Zn—Ni plated, and steel parts, throughout the aircraft and aerospace industry are currently being treated using this chromic acid process technology. Chromic acid conversion films, as formed on aluminum substrates, meet a 168 hours corrosion resistance criterion, but they primarily serve as a surface substrate for paint adhesion. Because of their relative thinness and low coating weights (40–150 milligrams/ft$^2$), chromic acid conversion coatings do not cause a fatigue life reduction in the aluminum structure.

However, environmental regulations in the United States, particularly in California, and in other countries are drastically reducing the allowed levels of hexavalent chromium compounds in effluents and emissions from metal finishing processes. Accordingly, chemical conversion processes employing hexavalent chromium compounds must be replaced. The present invention, which does not employ hexavalent chromium compounds, is intended to replace the previously used chromic acid process for forming conversion coatings on aluminum substrates.

SUMMARY OF THE INVENTION (A.) In one aspect, the invention is a process for forming a cobalt conversion coating on a metal substrate, thereby imparting corrosion resistance and paint adhesion properties. The invention was developed as a replacement for the prior art chromic acid process. The process includes the steps of: (a) providing a cobalt conversion solution comprising an aqueous reaction solution containing a soluble cobalt-III hexacoordinated complex, the concentration of the cobalt-III hexacoordinated complex being from about 0.01 mole per liter of solution to the saturation limit of the cobalt-III hexacoordinated complex, and acetic acid, $CH_3COOH$; and (b) contacting the substrate with the aqueous reaction solution for a sufficient amount of time, whereby the cobalt conversion coating is formed. The substrate may be aluminum or aluminum alloy, as well as Cd plated, Zn plated, Zn—Ni plated, and steel. The cobalt-III hexacoordinated complex is present in the form of $[Co(NH_3)_6]X_3$ wherein X is Cl, Br, $NO_3$, CN, SCN, $\frac{1}{3}PO_4$, $\frac{1}{2}SO_4$, $C_2H_3O_2$, or $\frac{1}{2}CO_3$.

(B.) In another aspect, the invention is a chemical conversion coating solution for producing a cobalt conversion coating on a metal substrate, the solution comprising an aqueous reaction solution containing a soluble cobalt-III hexacoordinated complex, the concentration of the cobalt-III hexacoordinated complex being from about 0.01 mole per liter of solution to the saturation limit of the cobalt-III hexacoordinated complex, and acetic acid, $CH_3COOH$. The aqueous reaction solution may be prepared by a bath makeup sequence including the steps of: (a) dissolving a cobalt-II salt; (b) then dissolving a metal nitrate salt such as $Mg(NO_3)_2 \cdot 6H_2O$, $Ca(NO_3)_2 \cdot 6H_2O$, $NaNO_3$, $KNO_3$, or $LiNO_3$; and (c) then adding ammonium acetate salt.

(C.) In yet another aspect, the invention is a coated article exhibiting corrosion resistance and paint adhesion properties, the article including: (a) a metal substrate; and (b) a cobalt conversion coating formed on the substrate, the cobalt conversion coating including aluminum oxide $Al_2O_3$ as the largest volume percent, and cobalt oxides $CoO$, $Co_3O_4$, and $Co_2O_3$.

BRIEF DESCRIPTION OF THE DRAWINGS

The figures herein are photomicrographs of images produced by a scanning electron microscope of coatings on aluminum alloy test panels. FIGS. 1 and 2 show a cobalt conversion coating 310 formed by a 25 minute immersion in a typical cobalt coating solution at 140° F. FIGS. 3 and 4 show a cobalt conversion coating 320 formed by a 15 minute immersion in a typical cobalt coating solution at 140° F. FIGS. 5-8 show a cobalt conversion coating 330 formed by a 20 minute immersion in a typical cobalt coating solution at 140° F. There does not appear to be any significant difference between coating 310, coating 320, and coating 330.

FIG. 1 is a photomicrograph at ×10,000 magnification of a test panel showing a cobalt conversion coating 310 of the invention. The photomicrograph is a top view, from an elevated angle, of the upper surface of oxide coating 310. The top of oxide coating 310 is porous and looks like a layer of chow mein noodles. This test panel was immersed in the cobalt conversion coating solution for 25 minutes. The white bar is a length of 1 micron. The roundish objects indicated by reference numeral 312 are unidentified impurities on the surface of the oxide coating.

FIG. 2 is a photomicrograph at ×50,000 magnification of the test panel of FIG. 1. The photomicrograph is a top view, from an elevated angle, of the upper surface of oxide coating 310. FIG. 2 is a close-up, at higher magnification, of a small area of the test panel. The white bar is a length of 1 micron. FIG. 3 is a photomicrograph at ×10,000 magnification of another test panel showing a side view, from an elevated angle, of a fractured cross section of a cobalt conversion coating 320 of the invention. The fractured cross section of the aluminum substrate of the test panel is indicated by reference numeral 322. This test panel was immersed in the coating bath for 15 minutes. To make the photomicrograph, the test panel was bent and broken off to expose a cross section of oxide coating 320. The white bar is a length of 1 micron. FIG. 4 is a photomicrograph at ×50,000 magnification of the test panel of FIG. 3 showing a side view, from an elevated angle, of a fractured cross section of cobalt conversion coating 320 of the invention. FIG. 4 is a close-up, at higher magnification, of a small area of the test panel. The aluminum substrate of the test panel is indicated by reference numeral 322. The white bar is a length of 1 micron.

FIG. 5 is a photomicrograph at ×10,000 magnification of another test panel showing another cobalt conversion coating 330 of the invention. The photomicrograph is a top view, from an elevated angle, of the upper surface of oxide coating 330. The top of oxide coating 330 is porous and looks like a layer of chow mein noodles. This test panel was immersed in the cobalt conversion coating solution for 20 minutes. The white bar is a length of 1 micron. The roundish objects 332 are unidentified impurities on the surface of oxide coating 330.

FIG. 6 is a photomicrograph at ×50,000 magnification of the test panel of FIG. 5. The photomicrograph is a top view, from an elevated angle, of the upper surface of oxide coating 330. FIG. 6 is a close-up, at higher magnification, of a small area of the test panel. The white bar is a length of 1 micron.

FIG. 7 is a photomicrograph at ×10,000 magnification of another test panel showing a side view, from an elevated angle, of a fractured cross section of cobalt conversion coating 330 of the invention. The aluminum substrate of the test panel is indicated by reference numeral 332. This test panel was immersed in the coating bath for 20 minutes. To make the photomicrograph, the test panel was bent and broken off to expose a cross section of oxide coating 330. The white bar is a length of 1 micron.

FIG. 8 is a photomicrograph at ×50,000 magnification of the test panel of FIG. 7 showing a side view, from an elevated angle, of a fractured cross section of cobalt conversion coating 330 of the invention. FIG. 8 is a close-up, at higher magnification, of a small area of the test panel. The aluminum substrate of the test panel is indicated by reference numeral 332. The white bar is a length of 1 micron.

DESCRIPTION OF THE PREFERRED EMBODIMENTS

Figure 1:
FIGS. 1-8 are photomicrographs (scanning electron microscope operated at 30 KV) of alloy 2024-T3 test panels with cobalt conversion coatings made by the invention.

I have invented two classes of cobalt conversion coatings. The first class is a cobalt conversion coating consisting of an oxide structure in unsealed condition and suitable for use in service where paint adhesion is especially important. The second class is a cobalt conversion coating consisting of an oxide structure in sealed condition and suitable for use in service where bare metal corrosion resistance performance is desired.

A considerable amount of empirical research was conducted in order to arrive at the present invention. A variety of multivalent compounds was investigated, used either by themselves or in combination with alkalies, acids, or fluorides. Among these compounds were vanadates, molybdates, cerates, ferrates and a variety of borates. While film deposition of compounds containing these elements on aluminum alloy substrates has been achieved, none afforded any appreciable corrosion protection nor paint adhesion.

A significant increase in corrosion protection was observed, however, when aluminum substrates were immersed in aqueous solutions of simple cobalt-II ($Co^{2+}$) salts heated to 180° F. This led to an investigation of a number of cobalt-II and cobalt-III ($Co^{3+}$) reactions, in particular as described in copending application Ser. No. 07/525,800 filed May 17, 1990.

In that invention, a stream of air is drawn for several hours through an aqueous solution containing a cobalt-II salt, such as $CoX_2$ (where $X = Cl$, $Br$, $NO_3$, $CN$, $SCN$, $\frac{1}{3}PO_4$, $\frac{1}{2}SO_4$, $C_2H_3O_2$, $\frac{1}{2}CO_3$), and the corresponding ammonium salt $NH_4X$, in the presence of ammonium hydroxide (ammonia) to form a cobalt-III hexammine coordination complex. For example, $$4 \text{CoX}_2 + 4 \text{NH}_4\text{X} + 20 \text{NH}_3 \xrightarrow{O_2} 4 [\text{Co}(\text{NH}_3)_6]\text{X}_3 + \text{water} \quad (1)$$

The above general reaction (1) was described extensively in copending application Ser. No. 07/525,800 filed May 17, 1990. The use of ammonium hydroxide (ammonia) was employed to generate the 3-valent ammine complex. Since that filing date, further research into cobalt-III hexammine complexes has produced a significant processing advantage if ammonium hydroxide is replaced with ammonium acetate, $CH_3COONH_4$, i.e., $$4 \text{CoX}_2 + 4 \text{NH}_4\text{X} + 20 \text{CH}_3\text{COONH}_4 \xrightarrow{O_2} \quad (2)$$
$$4 [\text{Co}(\text{NH}_3)_6]\text{X}_3 + 20 \text{CH}_3\text{COOH} + \text{water}$$

where X=Cl, Br, $NO_3$, CN, SCN, $\frac{1}{3}PO_4$, $\frac{1}{2}SO_4$, $C_2H_3O_2$, $\frac{1}{2}CO_3$.

This acetate buffered system does not require frequent pH adjustment as is necessary with the $NH_4OH$ addition in the ammonium hydroxide system due to high evaporation rates of ammonia. Furthermore, acetate buffered cobalt ammine complex solutions operate at optimum in the range of pH 6.0 to pH 7.0. Resultant oxide coatings have still further improvements in paint adhesion as well as corrosion resistance over the ammonium hydroxide system. Oxide coating weights can easily be produced from 20 up to 240 mg/ft$^2$. The complete absence of ammonia smell is a further distinct advantage from the standpoint of production adaptability. It is noted that all of the X-reactants listed under equation (2) were tested successfully, producing workable conversion coatings on aluminum substrates. However, nitrates gave best results with regard to coating performance and appearance. From an environmental standpoint, the cyanide and thiocyanate salts are not preferred.

An important aspect of cobalt chemical reactions is the fact that cobalt-II complexes have a strong tendency to oxidize to cobalt-III complexes, i.e., $$[\text{Co}(\text{NH}_3)_6]^{2+} \rightleftharpoons [\text{Co}(\text{NH}_3)_6]^{3+} + e^- \quad (3)$$

It was discovered that when aluminum alloy substrates (such as alloy 2024-T3) are immersed in the above aqueous solution of reaction containing the cobalt-III complex, bright iridescent coatings are formed on the aluminum alloy, which give excellent corrosion resistance properties. These coatings are comparable in color intensity to the conventional chromic acid conversion coatings.

The above cobalt complexes are not new. Typical use of cobalt-III complexes is made in the photo development industry as oxidizers to enhance the clarity of color photography. For example, Bissonette U.S. Pat. No. 4,088,486 teaches this photographic use of cobalt-III ammine complexes.

However, it is surprising that these reaction solutions containing cobalt-III hexammine complexes are capable of forming oxide structures on aluminum substrates. The exact reaction mechanism of the oxide formation is not completely understood at this time; while not desiring to be bound by a particular theory, the oxide formation is believed to function on the chemical equilibrium (3) shown above. The oxidizing ability of the cobalt-III hexammine complex is believed to be responsible for the formation of the observed oxide films (which I refer to as "cobalt conversion coatings") on aluminum substrates. The formation of oxide structures has been confirmed by instrumental analysis (Auger analysis and electron microscopy) of the coating. The photomicrographs in FIGS. 1–8 illustrate the appearance of the cobalt conversion coating of the invention.

A further improvement with regard to color consistency of the oxide coating was made when the associated ammonium salt $NH_4X$ in equation (2) was replaced with metal nitrate salts such as $Mg(NO_3)_2 \cdot 6H_2O$, $Ca(NO_3)_2 \cdot 6H_2O$, $NaNO_3$, $KNO_3$, or $LiNO_3$, i.e., $$4 \text{CoX}_2 + 2 \text{Mg}(\text{NO}_3)_2 \cdot 6\text{H}_2\text{O} + 24 \text{CH}_3\text{COONH}_4 \xrightarrow{O_2} \quad (4)$$
$$4 [\text{Co}(\text{NH}_3)_6]\text{X}_2\text{NO}_3 + 2 (\text{CH}_3\text{COO})_2\text{Mg} +$$
$$20 \text{CH}_3\text{COOH} + \text{water}$$

where X=Cl, Br, $NO_3$, CN, SCN, $\frac{1}{3}PO_4$, $\frac{1}{2}SO_4$, $C_2H_3O_2$, $\frac{1}{2}CO_3$.

The preferred reaction, however, was found to involve cobalt nitrate as shown below:

$$4 \text{Co}(\text{NO}_3)_2 \cdot 6\text{H}_2\text{O} + 2 \text{Mg}(\text{NO}_3)_2 \cdot 6\text{H}_2\text{O} + \quad (5)$$
$$24 \text{CH}_3\text{COONH}_4 \xrightarrow{O_2} 4 [\text{Co}(\text{NH}_3)_6](\text{NO}_3)_3 +$$
$$2 (\text{CH}_3\text{COO})_2\text{Mg} + 20 \text{CH}_3\text{COOH} + \text{water}$$

It became apparent during experimentation with this initial formulation that a number of parameters are important from the standpoint of optimum bath chemistry and uniform formation of oxide coating films. These parameters are: chemical reactant selection; chemical reactant concentrations; bath makeup sequence; pH control; temperature; and immersion time.

Chemical Reactant Selection

Regarding reactant selection, a wide variety of cobalt salts are operable for cobalt complexing. Among the cobalt-II salts which are operable in water solution are: cobalt nitrate, $Co(NO_3)_2 \cdot 6H_2O$; cobalt chloride, $\frac{1}{2}CoCl_2 \cdot 6H_2O$; cobaltous sulfate, $CoSO_4$; cobaltous acetate, $Co(CH_3COO)_2 \cdot 4H_2O$; and cobaltous basic carbonate, $2CoCO_3 \cdot Co(OH)_2 \cdot H_2O$. Each of the foregoing cobalt-II salts may be reacted with ammonium acetate and a metal nitrate salt such as $Mg(NO_3)_2 \cdot 6H_2O$, $Ca(NO_3)_2 \cdot 6H_2O$, $NaNO_3$, $KNO_3$, or $LiNO_3$.

It may also be noted that for aluminum and aluminum alloys the preferred reactants are $Co(NO_3)_2 \cdot 6H_2O$, $Mg(NO_3)_2 \cdot 6H_2O$, and $CH_3COONH_4$, since cobalt ammine complexes formed with the nitrate salts yield optimum coating performance results.

Furthermore, other cobalt-II salts may be used if they possess a minimum solubility in water. The minimum solubility needed is about 0.01 moles of cobalt-II salt per liter of water at 20° C. (68° F.).

A preferred chemical additive is an oxidizer, preferably hydrogen peroxide, $H_2O_2$. The function of the oxidizer is to oxidize the cobalt-II ions in solution to cobalt-III ions. The stream of air flowing into the tank functions as an oxidizer, so the presence of hydrogen peroxide is not essential for operability. The hydrogen peroxide increases the rate of oxidation of the cobalt-II ions in solution to cobalt-III ions and therefore is useful for commercial practice of the invention in that the solution becomes operational in a shorter period of time.

Thus the preferred chemical reactants and additives are:

| | |
|---|---|
| Cobalt nitrate | $Co(NO_3)_2.6H_2O$ |
| Ammonium acetate | $CH_3COONH_4$ same as $NH_4C_2H_3O_2$ |
| Magnesium nitrate | $Mg(NO_3)_2.6H_2O$ |
| Hydrogen peroxide (oxidizer) | $H_2O_2$ |

Chemical Concentration, pH Control, Temperature, And Immersion Time

With respect to chemical concentrations, the concentration of dissolved cobalt-II salt used may be from about 0.01 mole per liter of final solution up to the saturation limit of the cobalt-II salt employed. Preferably, the concentration of dissolved cobalt-II salt used may be from about 0.04 mole per liter of final solution up to 0.15 mole per liter of final solution. The concentration of the cobalt-III hexammine coordination complex may be from about 0.01 mole per liter of final solution up to the saturation limit of the cobalt-III hexammine coordination complex employed. Preferably, the concentration of the cobalt-III hexammine coordination complex may be from about 0.04 mole per liter of final solution up to 0.15 mole per liter of final solution.

The concentration of dissolved metal nitrate salt may be from about 0.03 to 2.5 moles per liter of final solution. Preferably, the concentration of dissolved metal nitrate salt used may be from about 0.05 mole per liter of final solution up to 0.2 mole per liter of final solution.

The concentration of ammonium acetate may be from about 0.06 to 6.0 moles per liter of final solution. Preferably, the concentration of dissolved ammonium acetate used may be from about 0.15 mole per liter of final solution up to 0.7 mole per liter of final solution; a stoichiometric excess of ammonium acetate is not detrimental. The concentration of the resulting acetic acid may be from about 0.05 to 5.0 moles per liter of final solution. Preferably, the concentration of the resulting acetic acid may be from about 0.125 mole per liter of final solution up to 0.6 mole per liter of final solution.

The pH of the bath may be from about 5.0 to 9.0 with 6.0 to 7.0 being preferred and 6.5 being most preferred. The temperature of the bath may be from about 68° F. to 160° F; above 160° F. gradual decomposition of the cobalt-III hexammine complex occurs. The optimum temperature is 140°±5° F. The immersion time may be from about 3 minutes to 60 minutes with the optimum immersion time at 20±5 minutes.

Preferred Bath Preparation Sequence

1. A stainless steel tank fitted with air agitation plumbing and heating coils is filled to ¾ with deionized water at a temperature of 68° F. to 90° F. Air agitation is commenced to a gentle bubble. (The tank may be equipped with a filter unit to remove any solid impurities (dust, aluminum silt, etc.) during processing.)

2. A quantity of cobalt-II salt ($Co(NO_3)_2.6H_2O$ is preferred) is added and completely dissolved. Stainless steel baskets may be used to hold the cobalt salt granules suspended in the water while dissolving. The most preferred molar ratio of cobalt salt to ammonium acetate is about 1 to 6 (see equation (4) above for stoichiometric balance). The most preferred concentration of cobalt salt is about 0.077 mole per liter of final solution. The amount used is based on the mole ratio of cobalt salt to ammonium acetate salt which will produce an oxide coating exhibiting high paint adhesion properties.

3. A quantity of metal nitrate salt ($Mg(NO_3)_2.6H_2O$ is preferred) is now added. The concentration of this additive may be from no addition up to 2.5 moles per liter of final solution, however the most preferred quantity is about 0.10 mole per liter of final solution for maximum color iridescence of the conversion coatings.

4. The ammonium acetate is now added and dissolved. When the most preferred concentration of cobalt salt of about 0.077 mole per liter of final solution is employed, then the most preferred concentration of ammonium acetate is about 35.6 gm (0.46 mole) per liter of final solution. This concentration of the ammonium acetate salt achieves the most preferred molar ratio of cobalt salt to ammonium acetate of about 1 to 6. Moderate air agitation is maintained.

5. The tank is filled to the final volume with deionized water. Air agitation of this solution is maintained for 2-3 hours at room temperature. Then a quantity of hydrogen peroxide, $H_2O_2$ (30 volume % preferred), is added. The preferred amount is about 0.03 to 0.1 moles of $H_2O_2$ (about 3 to 10 ml of $H_2O_2$ (30 volume %)) per liter of final solution.

6. The solution is maintained at preferably 68°-90° F. for at least an additional 2 hrs. to allow the cobalt complexing reaction (e.g., equation (4) above) to make a minimum operable amount of the cobalt-III complex, which is indicated by a burgundy to brownish/red color in the solution. Preferably, the solution is maintained at 68°-90° F. for an additional 8 hrs. to make a larger amount of the cobalt-III complex to facilitate efficient practice of the cobalt conversion coating process. The solution is then heated to 140°±5° F. which is the most preferred operating temperature. Use moderate air agitation of the solution during the cobalt conversion coating process.

7. Optionally, a second stainless steel tank (to be used for an oxide seal step) is prepared with air agitation plumbing and heating coils and is filled ¾ with deionized water. This post-cobalt conversion coating step serves as a corrosion resistance promoter. The tank is left unheated while adding the required chemicals.

8. A quantity of nickel sulfate, $NiSO_4.6H_2O$, and a quantity of magnesium nitrate, $Mg(NO_3)_2.6H_2O$, are added to the seal tank and dissolved. The preferred amount of nickel sulfate is about 20 gm (0.076 mole) per liter of final solution. The preferred amount of magnesium nitrate is about 20 gm (0.078 mole) per liter of final solution. Stir as necessary to dissolve.

9. The seal tank is then filled to final volume with deionized water and heated to 200°±5° F. No further air agitation is needed.

Preferred Overall Processing Sequences

The preferred overall processing sequences may be summarized as follows:

| PROCESS SEQUENCE FLOW CHART FOR MAXIMUM PAINT ADHESION |
|---|
| (1) PRECLEAN IF REQUIRED |
| (2) MASK AND RACK AS REQUIRED |
| (3) ALKALINE CLEAN AND RINSE |
| (4) DEOXIDIZE AND RINSE |
| (5) FORM OXIDE COATING: 15-20 MINUTES AT 140 ± 5° F. |
| (6) IMMERSION RINSE: 68-140° F. |
| (7) DRY-140° F. MAXIMUM |

| PROCESS SEQUENCE FLOW CHART FOR MAXIMUM CORROSION RESISTANCE |
| --- |
| (1) PRECLEAN IF REQUIRED |
| (2) MASK AND RACK AS REQUIRED |
| (3) ALKALINE CLEAN AND RINSE |
| (4) DEOXIDIZE AND RINSE |
| (5) FORM OXIDE COATING: 15-20 MINUTES AT 140 ± 5° F. |
| (6) IMMERSION RINSE: 68-140° F. |
| (7) SEAL AS REQUIRED |
| (8) RINSE-ROOM TEMPERATURE, 3 MINUTES MINIMUM |
| (9) DRY-140° F. MAXIMUM |

General Notes With Respect To The Above Process Flow Charts

The cobalt conversion coating should be applied after all trimming and fabrication have been completed. Parts, where solution entrapment is possible, should not be subjected to immersion alkaline cleaning or immersion deoxidizing; manual cleaning and manual deoxidizing procedures should be used to obtain water break-free surfaces before applying cobalt conversion treatment. A water break-free surface is a surface which maintains a continuous water film for a period of at least 30 seconds after having been sprayed or immersion rinsed in clean water at a temperature below 100° F.

Thorough rinsing and draining throughout processing is necessary as each solution should be completely removed to avoid interference with the performance of the next solution in the sequence. Parts should be processed from one step to the next without delay and without allowing the parts to dry. When it is necessary to handle wet parts, wear clean latex rubber gloves. After conversion coating, handle dry parts only with clean fabric gloves. For processing systems which require part clamping, the number and size of contact points should be kept to a minimum as necessary for adequate mechanical support.

Precleaning

Vapor degrease may be performed in accordance with Boeing Process Specification BAC 5408, emulsion clean in accordance with Boeing Process Specification BAC 5763, or solvent clean in accordance with Boeing Process Specification BAC 5750 if parts are greasy or oily. Parts with open faying surfaces or spot-welded joints where solution entrapment is possible should be immersed in cold water (or in hot and cold water) for 2 minutes after precleaning.

Masking And Racking

Areas which do not require cobalt conversion coatings should be masked with maskants. Dissimilar metal inserts (except chromium, nickel or cobalt alloy or plating, CRES, or titanium) and non-aluminum coated plasma flame sprayed area should be masked off.

Alkaline Cleaning

Alkaline clean and rinse may be performed in accordance with Boeing Process Specification BAC 5749, except for parts with open faying surfaces or spot welded joints, in which case, rinsing should be for at least 10 minutes using agitation with multiple immersions (a minimum of four times) followed by manual spray rinsing as required to prevent solution entrapment.

Deoxidizing

Deoxidize and rinse may be performed in accordance with Boeing Process Specification BAC 5765 except for parts where solution entrapment is possible, which parts may be rinsed using the method described above under "Alkaline Cleaning". Castings may be deoxidized by either of the following methods:

a. Deoxidize in accordance with Boeing Process Specification BAC 5765, Solution 37, 38 or 39.

b. Dry abrasive blast castings in accordance with Boeing Process Specification BAC 5748, Type II, Class 1 and rinse.

A specific solution formulation within the scope of the invention is as follows:

| Component | Make-Up Per Liter Of Final Solution | Control Limits |
| --- | --- | --- |
| Cobalt(ous) nitrate, $Co(NO_3)_2 \cdot 6H_2O$ (hexahydrate) | 22.5 gm (about 0.077 mole) | 20-25 g/L |
| Magnesium nitrate, $Mg(NO_3)_2 \cdot 6H_2O$ | 26.4 gm (about 0.10 mole) | 24-28 g/L |
| Ammonium acetate, $NH_4C_2H_3O_2$ | 35.6 gm (about 0.46 mole) | 33-38 g/L |
| Hydrogen peroxide, $H_2O_2$ (30 vol. %) | 5 ml (about 0.05 mole) | |
| Water | balance | |
| Temperature | | 140 ± 5° F. |
| pH | | 6.0 − 7.0 |

It should be noted that in the above formulation hydrogen peroxide, $H_2O_2$, is employed to convert the 2-valent cobalt salt into the 3-valent cobalt hexammine complex. While air bubbling (aeration) of the solution alone will be sufficient to convert the cobalt-II salt to cobalt-III complex, the procedure will be time consuming and complete conversion may take days to be obtained.

As mentioned above, in order to produce cobalt conversion coatings with maximum corrosion resistance performance (168 hrs. salt spray corrosion resistance, when tested in accordance with ASTM B117), it is necessary to subject the cobalt conversion coating to a sealing step. For this purpose, a number of sealing solutions were found to be useful. These are described in copending application Ser. No. 07/621,132 filed Nov. 30, 1990. Since then a further improvement with regard to solution stability as well as bath simplification has been achieved as shown below:

| Component | Make-Up Per Liter Of Final Solution | Control Limits |
| --- | --- | --- |
| Nickel sulfate, $NiSO_4 \cdot 6H_2O$ (hexahydrate) | 20 gm (about 0.076 mole) | 18-22 g/L |
| Magnesium nitrate, $Mg(NO_3)_2 \cdot 6H_2O$ | 20 gm (about 0.078 mole) | 18-22 g/L |
| Water | balance | |
| pH | | 5.0 − 6.5 |
| Operating temperature | | 200 ± 5° F. | pH Control, Temperature, And Immersion Time

The three parameters of pH control, temperature, and immersion time have been found to be important as relating to cobalt conversion coating performance.

Preferred pH control is maintained between pH 6.0 to 7.0, although coatings have been produced between pH 5.0 and 9.0. The preferred pH range is maintained by periodic small additions of $NH_4C_2H_3O_2$. Coatings tend to lose their colored iridescence to approach nearly-colorless appearance below pH 5.0. At a pH of 6.5, coatings have good corrosion resistance performance as well as acceptable paint adhesion performance.

A continuous operating temperature of 140°±5° F. gives optimum results with respect to coating appearance and performance.

Immersion times tend to be influenced by temperature and pH control rather than solution concentration. At 120°–130° F., immersion times in excess of 30 minutes are required for satisfactory conversion coating formation. At temperatures of 130° to 140° F., consistent and well functioning conversion coatings are produced within 15 to 20 minutes. Increased pH (above 7.0) will also reduce immersion time to 5–10 minutes, however optimum coatings are formed in the pH 6.5 region.

Oxide Coating Analyses

ESCA surface analysis, using a Perkin-Elmer Model 550 surface analyzer, and Auger oxide profiles, using the same machine (in a different operating mode), have been performed in order to characterize the cobalt conversion coatings of the invention. (ESCA=electron spectroscopy for chemical analysis (also known as XPS or X-ray photoelectron spectroscopy).) These analyses show that the cobalt conversion coating consists of a mixture of oxides, namely, aluminum oxide $Al_2O_3$ as the largest volume percent, and cobalt oxides $CoO$, $Co_3O_4$, and $Co_2O_3$. The term "largest volume percent" means that the volume of this oxide exceeds the volume of any other oxide which is present, but the term "largest volume percent" does not necessarily imply that the volume of this oxide is more than 50 volume percent.

The data further shows that in the lower portion of the oxide coating (that is, next to the aluminum substrate), the largest volume percent is $Al_2O_3$. The middle portion of the oxide coating is a mixture of $CoO$, $Co_3O_4$, $Co_2O_3$, and $Al_2O_3$. And the data shows that in the top portion of the oxide coating, the largest volume percent is a mixture of $Co_3O_4$ and $Co_2O_3$.

Figure 2:
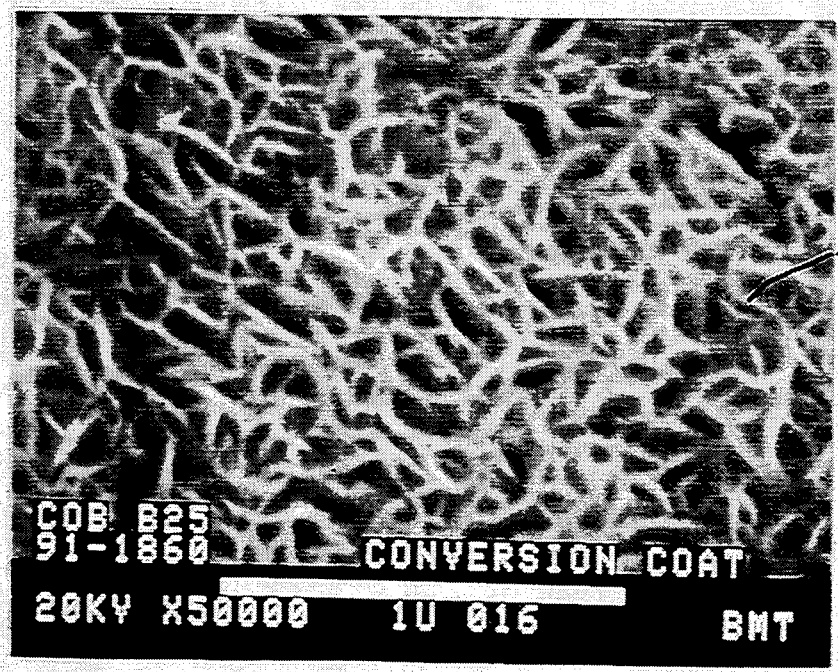
Figure 3:
Figure 4:
Figure 5:
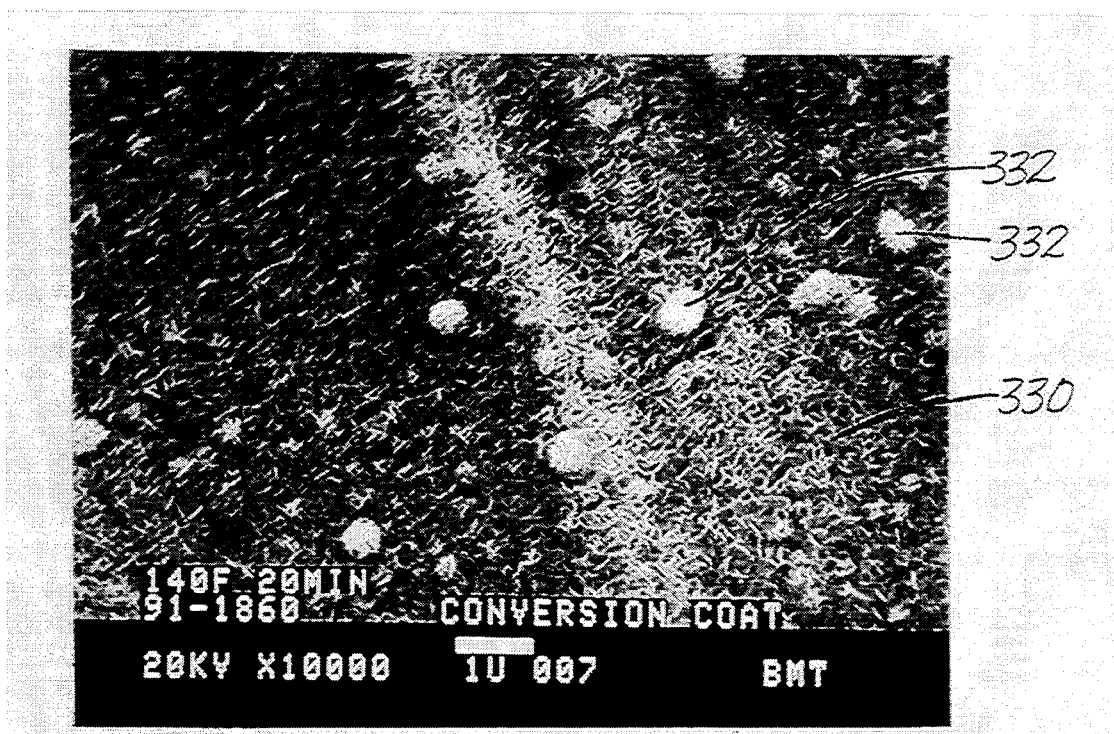
Figure 6:
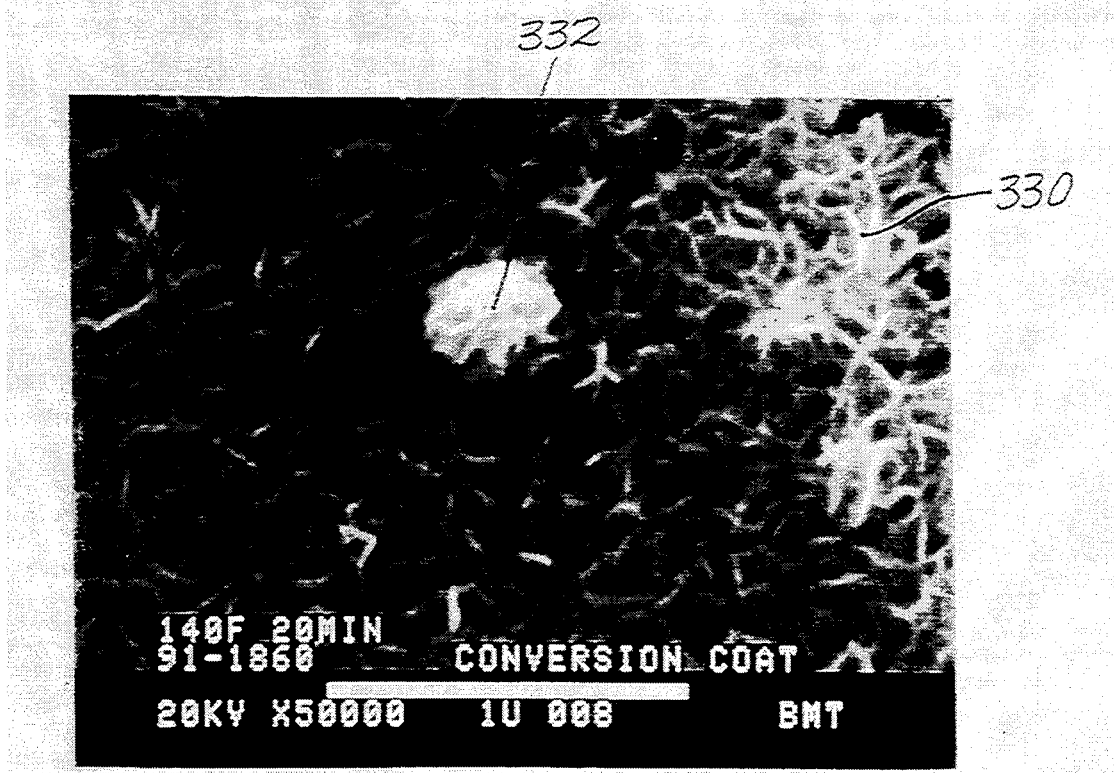
Figure 7:
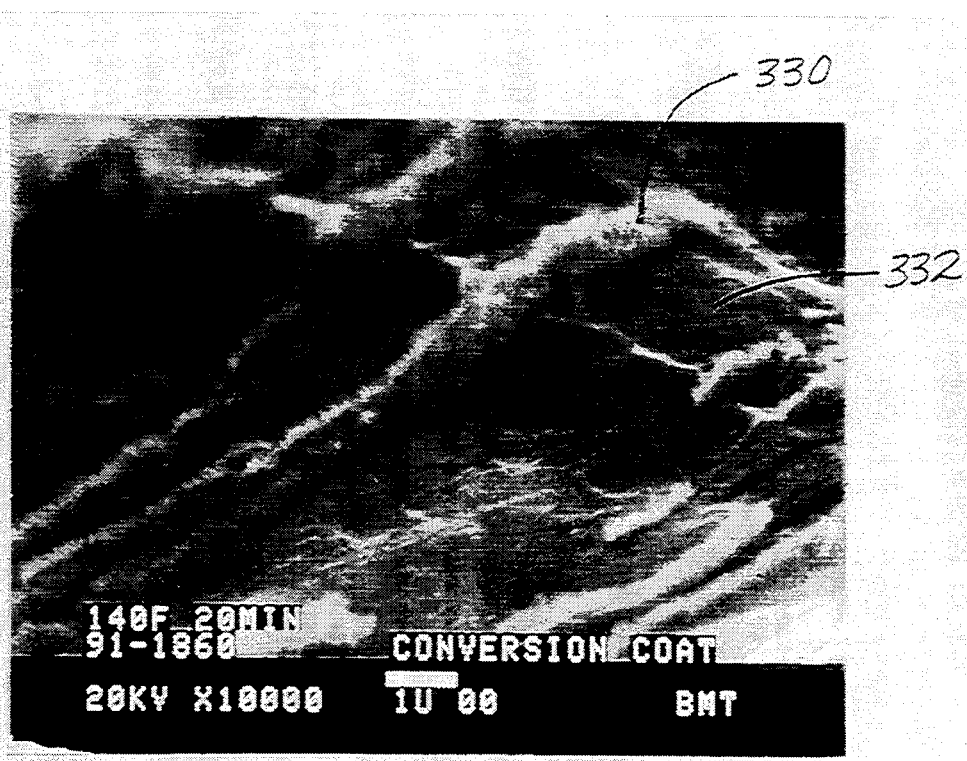
Figure 8:
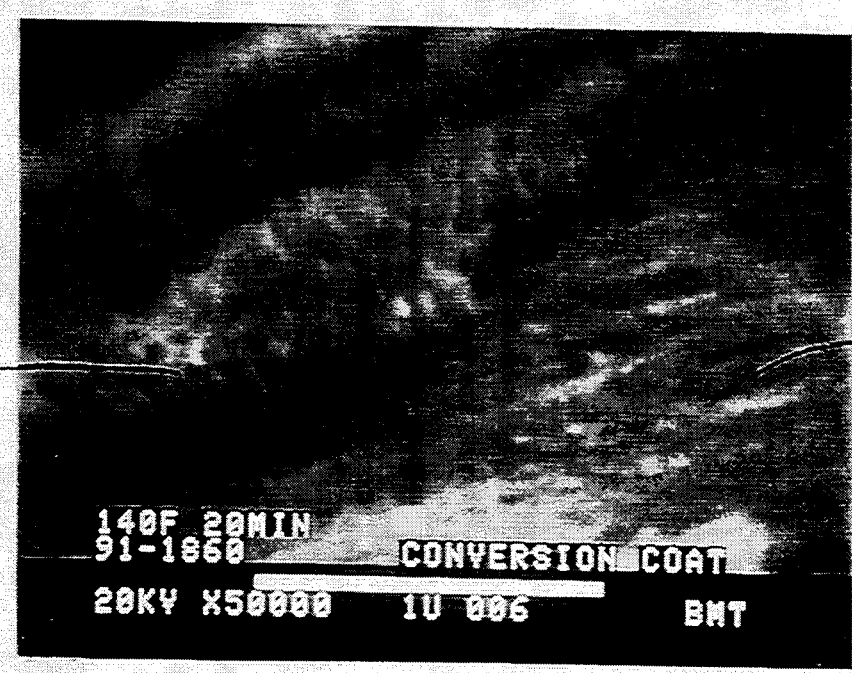

Additional characterization of the cobalt conversion coatings of the invention may be found in FIGS. 1–8 and in the descriptions of FIGS. 1–8 above. FIGS. 1 and 2 show a cobalt conversion coating 310 formed by a 25 minute immersion in a typical cobalt conversion coating solution. FIGS. 3 and 4 show a cobalt conversion coating 320 formed by a 15 minute immersion in a typical cobalt conversion coating solution. FIGS. 5–8 show a cobalt conversion coating 330 formed by a 20 minute immersion in a typical cobalt conversion coating solution. Comparing FIGS. 1–8, there does not appear to be any significant structural difference between coating 310, coating 320, and coating 330. The top surface of the cobalt conversion coating, as shown in FIGS. 1, 2, 5, and 6, bears a resemblance to chow mein noodles, thus providing appreciable surface area and porosity for good paint adhesion. Below the top surface, the coating becomes more dense and solid (non-porous).

Other Methods Of Application

The above formulation illustrates producing cobalt conversion coatings by immersion application. The same principles apply to producing the conversion coating by manual application and by spray application.

The patents, specifications, and other publications referenced above are incorporated herein by reference.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. A process for forming an oxide film cobalt conversion coating exhibiting corrosion resistance and paint adhesion properties on a metal substrate, said process comprising the steps of:

(a) providing an oxide film forming cobalt conversion solution comprising an aqueous reaction solution comprising a soluble cobalt-III hexammine complex and acetic acid, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, and $\frac{1}{2}CO_3$, and where said cobalt-III hexammine complex is made by reacting (1) a cobalt-II salt,
    (2) a metal nitrate salt, and
    (3) ammonium acetate, such that the concentration of said cobalt-III hexammine complex is from about 0.01 mole per liter of said aqueous reaction solution up to the saturation limit of said cobalt-III hexammine complex; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

2. The process of claim 1 wherein the concentration of said cobalt-III hexammine complex is from about 0.04 mole per liter of solution up to about 0.15 mole per liter of said aqueous reaction solution.

3. The process of claim 1 wherein said aqueous reaction solution has a pH of about 5.0 to 9.0.

4. The process of claim 1 wherein said aqueous reaction solution has a temperature of about 68°–160° F.

5. The process of claim 1 wherein said substrate is contacted with said aqueous reaction solution for a time of about 3 minutes to 60 minutes.

6. The process of claim 1 where an oxidizer is added to said aqueous reaction solution to oxidize the cobalt-II ions in said aqueous reaction solution to cobalt-III ions.

7. The process of claim 6 where said oxidizer is hydrogen peroxide, $H_2O_2$.

8. A process for forming an oxide film cobalt conversion coating exhibiting corrosion resistance and paint adhesion properties on a substrate, where said substrate is aluminum or aluminum alloy, said process comprising the steps of:

(a) providing an oxide film forming cobalt conversion solution comprising an aqueous reaction solution prepared by reacting a cobalt-II salt, a metal nitrate salt, and ammonium acetate, where the concentration of said cobalt-II salt is from about 0.01 mole per liter of said aqueous reaction solution up to the saturation limit of said cobalt-II salt, the concentration of said metal nitrate salt is from about 0.03 to 2.5 moles per liter of said aqueous reaction solution, and the concentration of ammonium acetate is from about 0.06 to 6.0 moles per liter of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

9. The process of claim 8 wherein said cobalt-II salt is a cobalt-II salt which has a minimum solubility of about 0.01 moles of cobalt-II salt per liter of water at 20° C. (68° F.).

10. The process of claim 8 wherein said cobalt-II salt is $CoX_2$ wherein X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

11. The process of claim 8 wherein said metal nitrate salt is selected from the group consisting of $Mg(NO_3)_2.6H_2O$, $Ca(NO_3)_2.6H_2O$, $NaNO_3$, $KNO_3$, or $LiNO_3$.

12. The process of claim 8 wherein an oxidizer is added to said aqueous reaction solution to oxidize the cobalt-II ions in said aqueous reaction solution to cobalt-III ions.

13. The process of claim 12 wherein said oxidizer is hydrogen peroxide, $H_2O_2$.

14. The process of claim 8 wherein said aqueous reaction solution is prepared by a bath makeup sequence comprising:
   (a) dissolving said cobalt-II salt;
   (b) then dissolving said metal nitrate salt; and
   (c) then adding ammonium acetate.

15. The process of claim 8 wherein said aqueous reaction solution has a pH of about 5.0 to 9.0.

16. The process of claim 8 wherein said aqueous reaction solution has a temperature of about 68°–160° F.

17. The process of claim 8 wherein said substrate is contacted with said aqueous reaction solution for a time of about 3 minutes to 60 minutes.

18. The process of claim 8 comprising the additional step of contacting said coated substrate with an aqueous sealing solution comprising nickel sulfate, $NiSO_4.6H_2O$, and magnesium nitrate, $Mg(NO_3)_2.6H_2O$.

19. The process of claim 8 where the concentration of said cobalt-II salt is from about 0.04 mole per liter of said aqueous reaction solution up to about 0.15 mole per liter of said aqueous reaction solution, the concentration of said metal nitrate salt is from about 0.05 mole per liter of said aqueous reaction solution up to about 0.2 mole per liter of said aqueous reaction solution, and the concentration of said ammonium acetate is from about 0.15 mole per liter of said aqueous reaction solution up to about 0.7 mole per liter of said aqueous reaction solution.

20. A process for forming an oxide film cobalt conversion coating exhibiting corrosion resistance and paint adhesion properties on a metal substrate, said process comprising the steps of:
   (a) providing an oxide film forming cobalt conversion solution comprising an aqueous reaction solution comprising a soluble cobalt-III hexammine complex and acetic acid, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, and $\frac{1}{2}CO_3$, and where said cobalt-III hexammine complex is made by reacting
      (1) a cobalt-II salt $CoX_2$,
      (2) an ammonium salt $NH_4X$, and
      (3) ammonium acetate $CH_3COONH_4$,
   such that the concentration of said cobalt-III hexammine complex is from about 0.01 mole per liter of said aqueous reaction solution up to the saturation limit of said cobalt-III hexammine complex; and
   (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

21. The process of claim 20 where an oxidizer is added to said aqueous reaction solution to oxidize the cobalt-II ions in said aqueous reaction solution to cobalt-III ions.

22. The process of claim 21 where said oxidizer is hydrogen peroxide, $H_2O_2$.

23. A process for forming an oxide film cobalt conversion coating exhibiting corrosion resistance and paint adhesion properties on a substrate, where said substrate is aluminum or aluminum alloy, said process comprising the steps of:
   (a) providing an oxide film forming cobalt conversion solution comprising an aqueous reaction solution prepared by reacting a cobalt-II salt, the associated ammonium salt, and ammonium acetate, where the concentration of said cobalt-II salt is from about 0.01 mole per liter of said aqueous reaction solution up to the saturation limit of said cobalt-II salt, the concentration of said ammonium salt is from about 0.03 to 2.5 moles per liter of said aqueous reaction solution, and the concentration of said ammonium acetate is from about 0.06 to 6.0 moles per liter of said aqueous reaction solution; and
   (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

24. The process of claim 23 where an oxidizer is added to said aqueous reaction solution to oxidize the cobalt-II ions in said aqueous reaction solution to cobalt-III ions.

25. The process of claim 24 where said oxidizer is hydrogen peroxide, $H_2O_2$.

26. The process of claim 23 where said cobalt-II salt is $CoX_2$ where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

27. The process of claim 23 where said ammonium salt is $NH_4X$ where X is selected from the group consisting of Cl, Br, $NO_3$ CN, SCN, $\frac{1}{3}PO_4$,$\frac{1}{2}SO_4$, $C_2H_3O_2$, or $\frac{1}{2}CO_3$.

28. A process for forming an oxide film cobalt conversion coating exhibiting corrosion resistance and paint adhesion properties on a substrate, where said substrate is aluminum or aluminum alloy, said process comprising the steps of:
   (a) providing an oxide film forming cobalt conversion solution comprising an aqueous reaction solution prepared by reacting cobalt nitrate $Co(NO_3)_2.6H_2O$, magnesium nitrate $Mg(NO_3)_2.6H_2O$, and ammonium acetate $NH_4C_2H_3O_2$, where the concentration of said cobalt nitrate is from about 20 to 25 grams per liter of said aqueous reaction solution, the concentration of said magnesium nitrate is from about 24 to 28 grams per liter of solution, and the concentration of said ammonium acetate is from about 33 to 38 grams per liter of solution; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

29. The process of claim 28 where an oxidizer is added to said aqueous reaction solution to oxidize the cobalt-II ions in said aqueous reaction solution to cobalt-III ions.

30. The process of claim 29 where said oxidizer is hydrogen peroxide, $H_2O_2$.

31. A process for forming an oxide film cobalt conversion coating exhibiting corrosion resistance and paint adhesion properties on a metal substrate, said process comprising the steps of:

(a) providing an oxide film forming cobalt conversion solution comprising an aqueous reaction solution prepared by reacting a cobalt-II salt, a metal nitrate salt, and ammonium acetate, where the concentration of said cobalt-II salt is from about 0.01 mole per liter of said aqueous reaction solution up to the saturation limit of said cobalt-II salt, the concentration of said metal nitrate salt is from about 0.03 to 2.5 moles per liter of said aqueous reaction solution, and the concentration of ammonium acetate is from about 0.06 to 6.0 moles per liter of final said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

32. The process of claim 31 where an oxidizer is added to said aqueous reaction solution to oxidize the cobalt-II ions in said aqueous reaction solution to cobalt-III ions.

33. The process of claim 32 where said oxidizer is hydrogen peroxide, $H_2O_2$.

34. The process of claim 31 where said cobalt-II salt is $CoX_2$ where X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

35. The process of claim 31 where said metal nitrate salt is selected from the group consisting of $Mg(NO_3)_2 \cdot 6H_2O$, $Ca(NO_3)_2 \cdot 6H_2O$, $NaNO_3$, $KNO_3$, or $LiNO_3$.

36. A process for forming an oxide film cobalt conversion coating exhibiting corrosion resistance and paint adhesion properties on a metal substrate, said process comprising the steps of:

(a) providing an oxide film forming cobalt conversion solution comprising an aqueous reaction solution prepared by reacting a cobalt-II salt, the associated ammonium salt, and ammonium acetate, where the concentration of said cobalt-II salt is from about 0.01 mole per liter of solution up to the saturation limit of said cobalt-II salt, the concentration of said ammonium salt is from about 0.03 to 2.5 moles per liter of final solution, and the concentration of ammonium acetate is from about 0.06 to 6.0 moles per liter of final solution; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

37. The process of claim 36 where an oxidizer is added to said aqueous reaction said cobalt conversion solution to oxidize the cobalt-II ions in said aqueous reaction solution to cobalt-III ions.

38. The process of claim 37 where said oxidizer is hydrogen peroxide, $H_2O_2$.

39. The process of claim 36 where said cobalt-II salt is $CoX_2$ where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

40. The process of claim 36 where said ammonium salt is $NH_4X$ where X is selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

41. The process of claim 36 where the concentration of said cobalt-II salt is from about 0.04 mole per liter of said aqueous reaction solution up to about 0.15 mole per liter of said aqueous reaction solution, the concentration of said ammonium salt is from about 0.05 mole per liter of said aqueous reaction solution up to about 0.2 mole per liter of said aqueous reaction solution, and the concentration of said ammonium acetate is from about 0.15 mole per liter of said aqueous reaction solution up to about 0.7 mole per liter of said aqueous reaction solution.

42. A process for forming an oxide film cobalt conversion coating exhibiting corrosion resistance and paint adhesion properties on a substrate, where said substrate is aluminum or aluminum alloy, said process comprising the steps of:

(a) providing an oxide film forming cobalt conversion said aqueous reaction solution comprising an aqueous reaction said aqueous reaction solution comprising a soluble cobalt-III hexammine complex and acetic acid, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, and $\frac{1}{2}CO_3$, and where said cobalt-III hexammine complex is made by reacting (1) a cobalt-II salt, (2) a metal nitrate salt, and (3) ammonium acetate, such that the concentration of said cobalt-III hexammine complex is from about 0.01 mole per liter of said aqueous reaction solution up to the saturation limit of said cobalt-III hexammine complex; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

43. The process of claim 42 where an oxidizer is added to said aqueous reaction solution to oxidize the cobalt-II ions in said aqueous reaction solution to cobalt-III ions.

44. The process of claim 42 where said oxidizer is hydrogen peroxide, $H_2O_2$.

45. A process for forming an oxide film cobalt conversion coating exhibiting corrosion resistance and paint adhesion properties on a substrate, where said substrate is aluminum or aluminum alloy, said process comprising the steps of:

(a) providing an oxide film forming cobalt conversion said aqueous reaction solution comprising an aqueous reaction said aqueous reaction solution comprising a soluble cobalt-III hexammine complex and acetic acid, where said cobalt-III hexammine complex is present in the form of $(CO(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, and $\frac{1}{2}CO_3$, and where said cobalt-III hexammine complex is made by reacting (1) a cobalt-II salt $CoX_2$,
(2) an ammonium salt $NH_4X$, and
(3) ammonium acetate $CH_3COONH_4$, such that the concentration of said cobalt-III hexammine complex is from about 0.01 mole per liter of said aqueous reaction solution up to the saturation limit of said cobalt-III hexammine complex; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

46. The process of claim 45 where an oxidizer is added to said aqueous reaction solution to oxidize the cobalt-II ions in said aqueous reaction solution to cobalt-III ions.

47. The process of claim 46 where said oxidizer is hydrogen peroxide, $H_2O_2$.

48. A process for forming an oxide film cobalt conversion coating exhibiting corrosion resistance and paint adhesion properties on a metal substrate, said process comprising the steps of:

(a) providing an oxide film forming cobalt conversion said aqueous reaction solution comprising an aqueous reaction said aqueous reaction solution comprising a soluble cobalt-III hexammine complex and acetic acid, where said cobalt-III hexammine complex is present in the form of $(Co(NH_3)_6)X_3$, where X is one or more selected from the group consisting of Cl, Br, $NO_3$, CN, SCN, $\frac{1}{3}PO_4$, $\frac{1}{2}SO_4$, $C_2H_3O_2$, and $\frac{1}{2}CO_3$, and where said cobalt-III hexammine complex is made by reacting (1) a cobalt-II salt,
(2) a metal nitrate salt,
(3) ammonium acetate, and
(4) hydrogen peroxide, such that the concentration of said cobalt-III hexammine complex is from about 0.01 mole per liter of said aqueous reaction solution up to the saturation limit of said cobalt-III hexammine complex; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

49. The process of claim 48 where the concentration of said cobalt-III hexammine complex is from about 0.04 mole per liter of said aqueous reaction solution up to about 0.15 mole per liter of said aqueous reaction solution.

50. The process of claim 48 where said cobalt aqueous reaction solution has a pH of about 5.0 to 9.0.

51. The process of claim 48 where said aqueous reaction solution has a temperature of about 68°–160° F.

52. The process of claim 48 where said substrate is contacted with said aqueous reaction solution for a time of about 3 minutes to 60 minutes.

53. A process for forming an oxide film cobalt conversion coating exhibiting corrosion resistance and paint adhesion properties on a substrate, where said substrate is aluminum or aluminum alloy, said process comprising the steps of:

(a) providing an oxide film forming cobalt conversion solution comprising an aqueous reaction solution prepared by reacting a cobalt-II salt, a metal nitrate salt, ammonium acetate, and hydrogen peroxide, where the concentration of said cobalt-II salt is from about 0.01 mole per liter of said aqueous reaction solution up to the saturation limit of said cobalt-II salt, the concentration of said metal nitrate salt is from about 0.03 to 2.5 moles per liter of said aqueous reaction solution, the concentration of ammonium acetate is from about 0.06 to 6.0 moles per liter of said aqueous reaction solution, and the concentration of hydrogen peroxide is from about 0.03 to 0.1 moles per liter of said aqueous reaction solution; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

54. The process of claim 53 where said cobalt-II salt is a cobalt-II salt which has a minimum solubility of about 0.01 moles of cobalt-II salt per liter of water at 20° C. (68° F.).

55. The process of claim 53 where said cobalt-II salt is $CoX_2$ wherein X is one or more selected from the group consisting of Cl, Br, $NO_3$, CN, SCN, $\frac{1}{3}PO_4$, $\frac{1}{2}SO_4$, $C_2H_3O_2$, or $\frac{1}{2}CO_3$.

56. The process of claim 53 where said metal nitrate salt is selected from the group consisting of $Mg(NO_3)_2 \cdot 6H_2O$, $Ca(NO_3)_2 \cdot 6H_2O$, $NaNO_3$, $KNO_3$, or $LiNO_3$.

57. The process of claim 53 where said aqueous reaction solution is prepared by a bath makeup sequence comprising:

(a) dissolving said cobalt-II salt;
(b) then dissolving said metal nitrate salt; and
(c) then adding ammonium acetate.

58. The process of claim 53 where said aqueous reaction solution has a pH of about 5.0 to 9.0.

59. The process of claim 53 where said aqueous reaction solution has a temperature of about 68°–160° F.

60. The process of claim 53 where said substrate is contacted with said aqueous reaction solution for a time of about 3 minutes to 60 minutes.

61. The process of claim 53 where the concentration of said cobalt-II salt is from about 0.04 mole per liter of said aqueous reaction solution up to about 0.15 mole per liter of said aqueous reaction solution, the concentration of said metal nitrate salt is from about 0.05 mole per liter of said aqueous reaction solution up to about 0.2 mole per liter of said aqueous reaction solution, and the concentration of said ammonium acetate is from about 0.15 mole per liter of said aqueous reaction solution up to about 0.7 mole per liter of said aqueous reaction solution.

* * * * *